United States Patent
Cai et al.

(10) Patent No.: US 12,061,953 B2
(45) Date of Patent: Aug. 13, 2024

(54) MULTI-EXPONENTIAL ERROR EXTRAPOLATION

(71) Applicant: Oxford University Innovation Limited, Botley (GB)

(72) Inventors: Zhenyu Cai, Harrogate (GB); Simon Benjamin, Harrogate (GB)

(73) Assignee: OXFORD UNIVERSITY INNOVATION LIMITED, Botley (GB)

( * ) Notice: Subject to any disclaimer, the term of this patent is extended or adjusted under 35 U.S.C. 154(b) by 0 days.

(21) Appl. No.: 17/926,146

(22) PCT Filed: Jul. 1, 2021

(86) PCT No.: PCT/EP2021/068262
§ 371 (c)(1),
(2) Date: Nov. 18, 2022

(87) PCT Pub. No.: WO2022/003135
PCT Pub. Date: Jan. 6, 2022

(65) Prior Publication Data
US 2023/0196173 A1 Jun. 22, 2023

(30) Foreign Application Priority Data
Jul. 2, 2020 (EP) .................................. 20183835

(51) Int. Cl.
*G06F 11/00* (2006.01)
*G06F 11/07* (2006.01)
(Continued)

(52) U.S. Cl.
CPC ......... *G06N 10/70* (2022.01); *G06F 11/0721* (2013.01); *G06F 11/079* (2013.01)

(58) Field of Classification Search
CPC .... G06N 10/70; G06F 11/0721; G06F 11/079
See application file for complete search history.

(56) References Cited

U.S. PATENT DOCUMENTS

2023/0196174 A1 6/2023 Cai et al.

FOREIGN PATENT DOCUMENTS

WO WO 2022/003134 A1 1/2022

OTHER PUBLICATIONS

Cai Multi-exponential error extrapolation and combining error mitigation techniques for NISQ application.2021. npj Quantum Information , pp. 1-12 . . . (Year: 2021).*

(Continued)

*Primary Examiner* — Samir W Rizk
(74) *Attorney, Agent, or Firm* — Jenkins, Taylor & Hunt, P.A.

(57) ABSTRACT

A method of mitigating errors when using a quantum computer comprising: performing S101 a first operation (21) on the state of a qubit a plurality of times; wherein the first operation (21) has a first error rate (32); obtaining S102 a first measurement of the average state of the qubit; modifying S103 the error rate of the quantum computer from the first error rate (32) to a second error rate (34); performing S104 a second operation (23) on the state of the qubit a plurality of times; wherein the second operation (23) has the second error rate (34); obtaining S105 a second measurement of the average state of the qubit; modifying S106 the error rate of the quantum computer from the second error rate to a third error rate; performing S107 a third operation on the state of the qubit a plurality of times; wherein the third operation has the third error rate; obtaining S108 a third measurement of the average state of the qubit; modifying S109 the error rate of the quantum computer from the third error rate to a fourth error rate; performing S110 a fourth operation on the state of the qubit a plurality of times; wherein the fourth operation has the fourth error rate; obtaining S111 a fourth measurement of the average state of the qubit; fitting S112 the first, second, third and fourth (Continued)

measurements to a multi-exponential decay curve (35); and extrapolating S113 the average state of the qubit at a fifth error rate (37) using the fitted curve (35), wherein the fifth error rate (37) is lower than the first, second, third and fourth error rates.

14 Claims, 3 Drawing Sheets

(51) Int. Cl.
- *G06F 11/30* (2006.01)
- *G06N 10/70* (2022.01)
- *G08C 25/00* (2006.01)
- *H03M 13/00* (2006.01)
- *H04L 1/00* (2006.01)

(56) References Cited

OTHER PUBLICATIONS

Written Opinion of the International Searching Authority for International Application No. PCT/EP2021/068262 (Oct. 12, 2021).
International Search Report for International Application No. PCT/EP2021/068262 (Oct. 12, 2021).
Written Opinion of the International Searching Authority for International Application No. PCT/EP2021/068261 (Oct. 7, 2021).
International Search Report for International Application No. PCT/EP2021/068261 (Oct. 7, 2021).
Communication of the extended European search report for European Application No. 20183833.1 (Dec. 23, 2020).
Communication of the extended European search report for European Application No. 20183835.6 (Dec. 23, 2020).
Maciejewski et al., "Mitigation of readout noise in near-term quantum devices by classical post-processing based on detector tomography," arXiv:1907.08518v2, pp. 1-23 (Mar. 25, 2020).
Cai, "Multi-exponential Error Extrapolation and Combining Error Mitigation Techniques for NISQ Applications," arXiv:2007.01265v1, pp. 1-24 (Jul. 2, 2020).
Bonet-Monroig et al., "Low-cost error mitigation by symmetry verification," arXiv:1807.10050v3, pp. 1-11 (Jan. 2, 2019).
Kandala et al., "Error mitigation extends the computational reach of a noisy quantum processor," Nature, vol. 567, pp. 491-501 (Mar. 28, 2019).
Endo et al., "Practical Quantum Error Mitigation for Near-Future Applications," arXiv:1712.09271v2, pp. 1-20 (May 27, 2018).

\* cited by examiner

MULTI-EXPONENTIAL ERROR EXTRAPOLATION

FIELD OF THE INVENTION

The present invention relates to error mitigation techniques in quantum computing.

BACKGROUND TO THE INVENTION

Quantum computers can be used to compute an "observable", i.e. a property of a system. In order to measure an observable, the output state of a qubit can be measured after performing a sequence of quantum operations on the qubit. The same sequence of quantum operations is typically repeated many times, and an average of the measured output states can be calculated to estimate the expected value of the observable.

However, the sequence of quantum operations performed on the qubit, and thus the estimated expected value, is subject to errors. It is an aim of quantum computation to reduce, or even eliminate, these errors. However, a more realistic approach for near-future quantum devices, or noisy intermediate-scale quantum (NISQ) era quantum devices, is to aim to mitigate these errors using analytical approaches. In this way, the error-free, or noiseless, expected value of the observable can be estimated.

Error mitigation techniques use extra measurements to extract the noise-free expectation values from the noisy measurement results. One error mitigation technique used is error extrapolation. In this technique, the noise level is artificially enhanced through physical control of the hardware, and the expected value is measured and plotted as a function of noise. The expected value changes with increased noise, following a trend. A noiseless value can be estimated by fitting the measurements to the trend and extrapolating to determine the expected value for an error-free quantum computation.

The form of the trend is important, as this will affect the estimation. It is desirable to develop techniques that can improve the accuracy of the estimate.

SUMMARY OF THE INVENTION

An aspect of the invention provides a method of mitigating errors when using a quantum computer. The method comprises: performing a first operation on the state of a qubit a plurality of times; wherein the first operation has a first error rate; obtaining a first measurement of the average state of the qubit; modifying the error rate of the quantum computer from the first error rate to a second error rate; performing a second operation on the state of the qubit a plurality of times; wherein the second operation has the second error rate; obtaining a second measurement of the average state of the qubit; modifying the error rate of the quantum computer from the second error rate to a third error rate; performing a third operation on the state of the qubit a plurality of times; wherein the third operation has the third error rate; obtaining a third measurement of the average state of the qubit; modifying the error rate of the quantum computer from the third error rate to a fourth error rate; performing a fourth operation on the state of the qubit a plurality of times; wherein the fourth operation has the fourth error rate; obtaining a fourth measurement of the average state of the qubit; fitting the first, second, third and fourth measurements to a multi-exponential decay curve; and extrapolating the average state of the qubit at a fifth error rate using the fitted curve, wherein the fifth error rate is lower than the first, second, third and fourth error rates.

An advantage of this method is improved error mitigation. The use of a multi-exponential decay curve provides an accurate estimate of the noiseless observable. In particular, the estimate is typically more accurate than that obtained using alternatives such as a single exponential decay curve. The fifth error rate is lower than each of the first, second, third and fourth error rates.

Preferably, the multi-exponential decay curve is the sum of K exponential curves, wherein K≥2. Each decay curve may have a different decay rate. The multi-exponential decay curve used to fit the obtained measurements preferably has the following form: $E=\sum_{k=1}^{K} A_k e^{-\gamma_k n}$. Here, E is the average state of the qubit, n is an error rate, and $A_k$ and $\gamma_k$ are fitting parameters. The error rate is preferably the number of errors which are expected to occur when an operation is performed. This form of multi-exponential decay curve indicates that the expected value, the average state of the qubit, reduces exponentially as the error rate, n, is increased.

Inputting K=1 into the above equation returns a single exponential decay curve. For a multi-exponential decay curve, K is generally greater than or equal to two. Optionally, in the above equation, K=2. Therefore the multi-exponential decay curve may be a dual-exponential decay curve with the following form: $E=A_1 e^{-\gamma_1 n}+A_2 e^{-\gamma_2 n}$. An advantage of using a summation of only two exponentials in this way is a reduction in the likelihood of overfitting. Overfitting may occur if the number of measurements is not sufficient to determine the fitting parameters. The result of overfitting is a poor estimation of the expected value.

The number of exponentials, K, which are chosen to result in the best fit may be greater than two. In order to prevent overfitting of the data, fitting analysis may be performed to determine a suitable value for K. For example, a threshold for a fitting loss function may be set, wherein the curve with the lowest value of K that reaches the fitting threshold may be selected. Advantageously, by setting a threshold, an improved fit may be determined. Furthermore, selecting the minimum acceptable number of exponentials beneficially avoids overfitting of the data.

$A_k$ and $\gamma_k$ are fitting parameters used in the multi-exponential decay curve. Preferably, the fitting parameter $\gamma_k$ is greater than or equal to 0, and less than or equal to 1, i.e. $0 \leq \gamma_k \leq 1$. This limitation on the fitting parameter $\gamma_k$ may arise from an assumption that the errors occur stochastically. In this case, for very large numbers of errors, the expected value of the observable may be expected tend to zero.

The error rate, n, is typically proportional to the number of possible error locations, M. The number of possible error locations, M, may be assumed to be large, i.e. much greater than 1, and may depend on the specific design of the quantum circuit and the chosen implementation of quantum operations. Accordingly, the error rate, n, may also depend on the circuit design and implementation. The errors may be Pauli errors or may be transformed into Pauli errors. Transformation from a non-Pauli error to a Pauli error may be achieved using Pauli twirling. Advantageously, a multi-exponential decay curve has been found to be a good noise model for Pauli errors.

The first, second, third and fourth error rates at which the first, second, third and fourth operations are performed respectively, may be different. This advantageously results in first, second, third and fourth measurements at different error rates which may enable the fitting of the first, second, third and fourth measurements to a curve. Preferably, the second error rate is higher than the first error rate. Optionally, the third error rate is higher than the second error rate and the fourth error rate is higher than the third error rate. Alternatively, the first, second, third and fourth error rates may be in any order. The error rate is preferably increased by adding noise from the same noise model. This advantageously improves the accuracy of the prediction of the average state of the qubit at the fifth error rate. The fifth error rate is lower than each of the first, second, third and fourth error rates; the fifth error rate may be zero.

In one example, the error rate may be increased using additional operations. Optionally, the second operation comprises the first operation and a modifying operation. Optionally, each of the second, third and fourth operations comprise the first operation and a modifying operation. One or more of the second, third and fourth operations may comprise more than one modifying operation. Preferably, each of the second, third and fourth operations comprise at least the first operation. For example, the third operation may comprise the first operation, a first modifying operation, and a second modifying operation. The second modifying operation may be the same as the first modifying operation, or may be different. In a further example, the fourth operation may comprise the first operation and first, second and third modifying operations. In this example, the first and third modifying operations may be the same and the second modifying operation may be different, or the second and third modifying operations may be the same and the first modifying operation may be different, or the first and second modifying operations may be the same and the third modifying operation may be different, or the first, second and third modifying operations may all be the same or all be different. The use of "first", "second" and "third" in the above paragraph does not relate to an order in which the modifying operations are performed and does not relate to particular operations.

Generally, any of the second, third and fourth operations may comprise one or more modifying operations in addition to the first operation, and the one or more modifying operations may all be different or, in a scenario with two or more modifying operations, any two or more may be the same.

The modifying operations may be chosen according to the predicted noise model. For example, each modifying operation may comprise a Pauli operation such as a Pauli-X ($\sigma_x$), Pauli-Y ($\sigma_y$) or Pauli-Z ($\sigma_z$) operator. The choice of operator may be selected at random. The second operation is performed a plurality of times. Preferably, each performance of the second operation includes a random modifying operation which may be the same or different to the previously performed modifying operation. Optionally, the modifying operation comprises multiple additional operations.

Generally, when an operation (such as the second, third, or fourth operation) comprises the first operation and more than one modifying operation, the plurality of modifying operations are preferably selected randomly and the selection may be different each time said operation is performed.

The first operation may comprise a plurality of operations performed sequentially. Similarly, the second operation may comprise a plurality of operations performed sequentially. The first operation is typically performed using a quantum device. The second operation is preferably performed using the same quantum device, with a modified error rate, at a different point in time. The third and fourth operations are also preferably performed using the same quantum device, with further modified error rates, at different points in time.

Preferably, performing the first operation a plurality of times comprises performing a plurality of first operations and performing the second operation a plurality of times comprises performing a plurality of first operations and a plurality of modifying operations. Preferably, performing the third and fourth operations a plurality of times comprises performing a plurality of first operations and a plurality of the one or more modifying operations. Typically the first measurement of the average state of the qubit is obtained by averaging the measurements recorded following the performance of each of the plurality of first operations. Similarly, the second, third and fourth measurements of the average state of the qubit may be obtained by averaging the measurements recorded following the performance of the second, third and fourth operations respectively. Typically, the first operation is performed a plurality of times and the first measurement of the average state of the qubit is obtained prior to performing the second operation a plurality of times in order to obtain the second measurement of the average state of the qubit. Similarly, the second measurement is typically obtained prior to performing the third operation and the third measurement is typically obtained prior to performing the fourth operation. This advantageously reduces the measurement uncertainty in the first, second, third and fourth measurements of the average state of the qubit.

The second operation may be performed a plurality of times by performing each of the plurality of first operations and each of the plurality of modifying operations in any order. Preferably, performing the second operation a plurality of times comprises performing one of the plurality of modifying operations after each of the plurality of first operations. A benefit of performing the second operation a plurality of times by performing each of the plurality of the first and modifying operations in an alternating manner in this way advantageously results in a fixed second error rate. It should be noted that the error rate is an expected value and that the actual number of errors which occur will vary each time an experiment with a fixed error rate is performed.

Typically, for a second, third or fourth operation comprising more than one modifying operation in addition to the first operation, performing the second, third or fourth operation a plurality of times comprises performing the two or more modifying operations in any order after each of the plurality of first operations.

The first, second, third and/or fourth operations may transform the state of the qubit from an input state to an output state which can be measured. The state of the qubit may be initialised. In particular, the state of the qubit may be initialised prior to performing each of the first, second, third and/or fourth operations a plurality of times so as to provide a uniform initial state. Initialisation of a qubit may provide a uniform initial qubit state. Measurement of the output state of the qubit may be affected by the initial state, and therefore it is preferable for a qubit to enter the quantum circuit in an initialised, or zero, state. The state of the qubit may be initialised before the first operation is first performed, and the state of the qubit may be initialised before the second operation is first performed, and the state of the qubit may be initialised before the third operation is first performed, and the state of the qubit may be initialised before the fourth operation is first performed.

Further operations may be performed on the state of the qubit. Optionally, each additional operation is performed on the state of the qubit a plurality of times in order to obtain a measurement of the average state of the qubit. Preferably, the state of the qubit is initialised before each of the further operations is performed for the first time. Generally, the method may include modifying the error rate of the quantum computer to an i-th error rate; performing an i-th operation on the state of the qubit; wherein the i-th operation has the i-th error rate; and wherein the i-th error rate is greater than the first error rate; obtaining an i-th measurement of the average state of the qubit; and fitting the first, second, third and fourth measurements and the i-th measurement to the multi-exponential decay curve. Preferably, the method further includes extrapolating the average state of the qubit at the fifth error rate using the fitted curve, wherein the fifth error rate is lower than the first, second, third, fourth and i-th error rates.

Taking further measurements at additional error rates in this way advantageously improves the estimate of the fitting parameters in the multi-exponential decay curve and consequently improves the estimate of the value of the error-free observable. A dual-exponential decay curve has four free fitting parameters: $A_1$, $\gamma_1$, $A_2$ and $\gamma_2$. Accordingly, for a dual-exponential decay curve, at least four different operations are performed, each at a different error rate. Similarly, a triple-exponential decay curve has six free fitting parameters. Preferably, for a triple-exponential decay curve, at least six different operations are performed, each at a different error rate. Typically, the number of different error rates is greater than or equal to 2 K, wherein K is the number of exponentials in the multi-exponential decay curve. The error rate of the quantum computer may be modified to an i-th error rate using one or more random Pauli gates as described in relation to the second operation. The addition of random Pauli gates may increase the errors arising due to Pauli noise.

Another aspect of the invention provides a device for performing quantum computing calculations. The device comprises a quantum processor configured to perform a first operation a plurality of times on the state of a qubit, wherein the first operation has a first error rate; perform a second operation a plurality of times on the state of the qubit, wherein the second operation has a second error rate; perform a third operation a plurality of times on the state of the qubit, wherein the third operation has a third error rate; and perform a fourth operation a plurality of times on the state of the qubit, wherein the fourth operation has a fourth error rate. The device further comprises a quantum measurement gate configured to: obtain a first measurement of the average state of the qubit after the first operation; obtain a second measurement of the average state of the qubit after the second operation; obtain a third measurement of the average state of the qubit after the third operation; and obtain a fourth measurement of the average state of the qubit after the fourth operation. The device further comprises a classical processor configured to fit the first, second, third and fourth measurements to a multi-exponential decay curve, and to extrapolate the average state of the qubit at a fifth error rate using the fitted curve, wherein the fifth error rate is lower than the first, second, third and fourth error rates.

Advantageously the first, second, third and fourth measurements obtained at different error rates using the device can be used to predict the average state of the qubit at a lower error rate using extrapolation. The fifth error rate may be selected as a zero error rate to estimate the average state of the qubit without noise.

A further aspect of the invention provides a computer readable memory medium comprising instructions which when executed by a computer cause the computer to carry out steps on a quantum computer comprising: performing a first operation a plurality of times on the state of a qubit; wherein the first operation has a first error rate; obtaining a first measurement of the average state of the qubit; modifying the error rate of the quantum computer from the first error rate to a second error rate; performing a second operation a plurality of times on the state of the qubit; wherein the second operation has the second error rate; obtaining a second measurement of the average state of the qubit; modifying the error rate of the quantum computer from the second error rate to a third error rate; performing a third operation a plurality of times on the state of the qubit; wherein the third operation has the third error rate; obtaining a third measurement of the average state of the qubit; modifying the error rate of the quantum computer from the third error rate to a fourth error rate; performing a fourth operation a plurality of times on the state of the qubit; wherein the fourth operation has the fourth error rate; obtaining a fourth measurement of the average state of the qubit; fitting the first, second, third and fourth measurements to a multi-exponential decay curve; and extrapolating the average state of the qubit at a fifth error rate using the fitted curve, wherein the fifth error rate is lower than the first, second, third and fourth error rates.

It is difficult to eliminate errors which occur in a quantum computer using physical improvements. Advantageously the execution of these steps result in a mathematical estimation of the average state of the qubit at a reduced error rate.

Another aspect of the invention provides a method of mitigating errors when using a quantum computer. The method comprises: performing a first operation on the state of a qubit; wherein the first operation has a first error rate; obtaining a first measurement of the average state of the qubit; modifying the error rate of the quantum computer from the first error rate to a second error rate; performing a second operation on the state of the qubit; wherein the second operation has the second error rate; obtaining a second measurement of the average state of the qubit; fitting the first and second measurements to a multi-exponential decay curve; and extrapolating the average state of the qubit at a third error rate using the fitted curve, wherein the third error rate is lower than the first error rate and the second error rate.

A further aspect of the invention provides a device for performing quantum computing calculations, wherein the device comprises: a quantum processor configured to perform a first operation on the state of a qubit, wherein the first operation has a first error rate, and to perform a second operation on the state of the qubit, wherein the second operation has a second error rate; a quantum measurement gate configured to obtain a first measurement of the average state of the qubit after the first operation, and to obtain a second measurement of the average state of the qubit after the second operation; and a classical processor configured to fit the first measurement and the second measurement to a multi-exponential decay curve, and to extrapolate the average state of the qubit at a third error rate using the fitted curve, wherein the third error rate is lower than the first error rate and the second error rate.

Another aspect of the invention provides a computer readable memory medium comprising instructions which when executed by a computer cause the computer to carry out steps on a quantum computer comprising: performing a first operation on the state of a qubit; wherein the first operation has a first error rate; obtaining a first measurement of the average state of the qubit; modifying the error rate of the quantum computer from the first error rate to a second error rate; performing a second operation on the state of the qubit; wherein the second operation has the second error rate; obtaining a second measurement of the average state of the qubit; fitting the first measurement and the second measurement to a multi-exponential decay curve; and extrapolating the average state of the qubit at a third error rate using the fitted curve, wherein the third error rate is lower than the first error rate and the second error rate.

BRIEF DESCRIPTION OF THE DRAWINGS

Embodiments of the invention will now be described with reference to the accompanying drawings in which.

DETAILED DESCRIPTION

Figure 1:
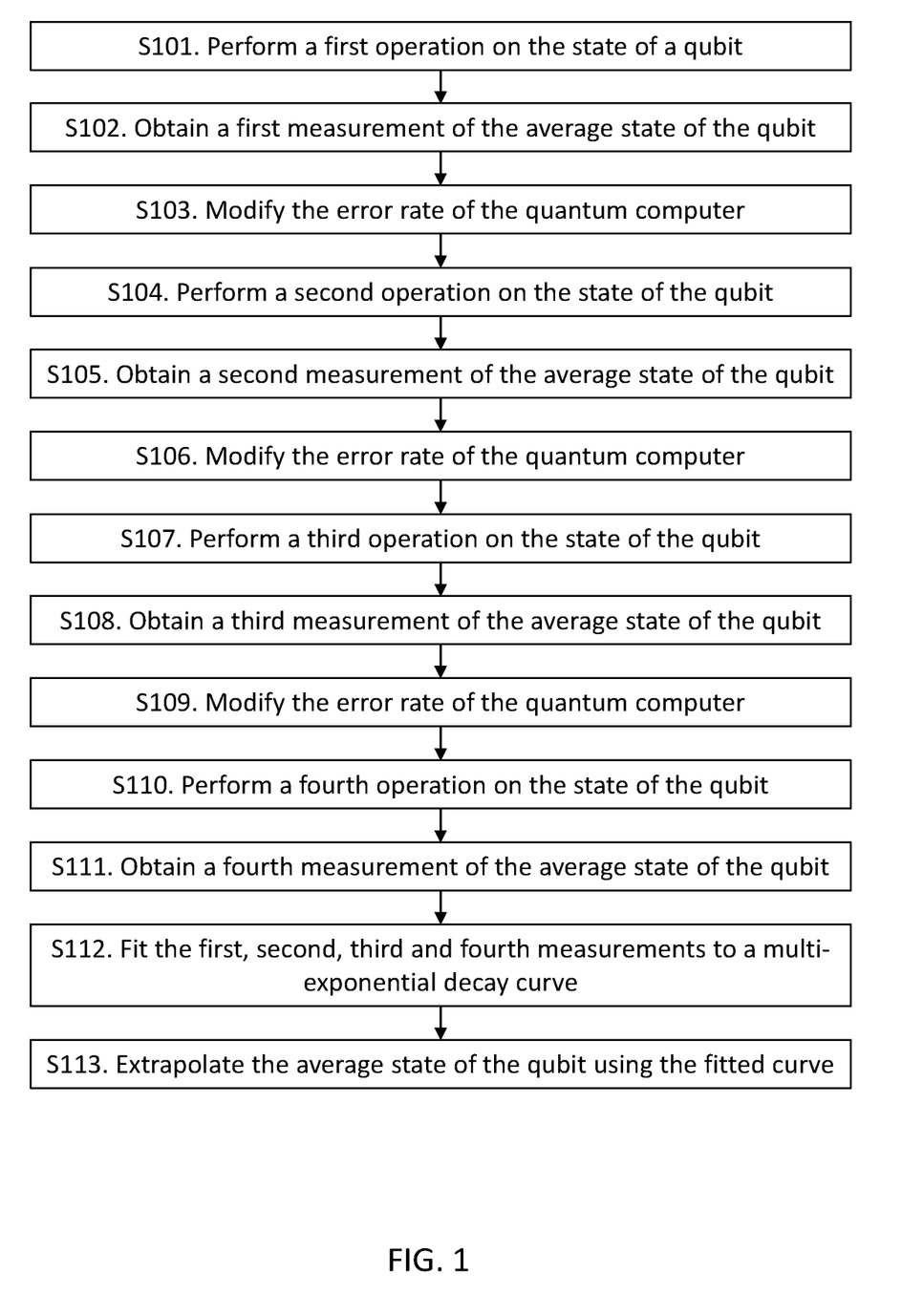
FIG. 1 is a flow chart of an error mitigation method in accordance with a first embodiment.

FIG. 1 is a flow chart depicting an embodiment of the method of mitigating errors. A quantum computation typically involves: initialising a set of qubits; performing a sequence of quantum operations on the set of qubits; and measuring the output state of each of the qubits.

In step S101, a first operation is performed on the state of a qubit using a quantum processor. In this embodiment, prior to the performing of the first operation, the qubit is initialised to a zero state. The first operation transforms the state of the qubit. The qubit is one of a set of qubits. Each qubit in the set of qubits can be operated upon simultaneously, but may undergo a different state transformation. The first operation comprises a plurality of operations which may include quantum logic gates such as Pauli gates, Hadamard gates and controlled not (CNOT) gates. The plurality of operations is performed sequentially. The first operation has a first error rate, $n_1$, which is the number of errors which are expected to occur when the first operation is performed. It is assumed that the number of possible error locations, M, is large and that the first error rate is on the order 1, i.e. M>>1; n~1. Examples of errors that may occur in the quantum device include Pauli errors such as dephasing errors and depolarising errors. Pauli errors are a form of Markovian errors. Markovian errors which are not Pauli errors may transformed into Pauli errors using the Pauli twirling technique.

The first operation is performed a plurality of times. After each performance of the first operation, the state of the qubit is measured. In step S102, a first measurement of the average state of the qubit is obtained using a quantum measurement device. A measurement of the state of the qubit is obtained after the first operation has been performed. The state of the qubit is generally a superposition of a first state |0> and a second state |1>. However, the measured state of the qubit following each performance of the operation will be either the first state or the second state. If the qubit is in the first state, the recorded measurement is −1. Alternatively, if the qubit is in the second state, the measurement is recorded as +1. By performing the same operation a plurality of times, the average state of the qubit can be determined. The first measurement is obtained in S102 by averaging the measurements recorded following the performance of each of the plurality of first operations.

The first and second states differ depending on the type of qubit. Accordingly, the measured property of the qubit depends on the type of qubit. The quantum measurement device is selected to correspond to the type of qubit. For example, the first and second states of an electron spin qubit are spin up and spin down, with spin up recorded as +1, and spin down recorded as −1. Therefore a measurement of an electron spin qubit is obtained by measuring the electron spin, and the quantum measurement device is configured to measure electron spin.

The electron charge is measured if the qubit is an electron charge qubit, in which the first and second states are no electrons and one electron. The excitation state is measured if the qubit is a superconducting phase qubit, in which the first and second states are the ground sate and the first excited state. Any quantum system with first and second measurable states can be used as a qubit. A suitable quantum measurement device which enables the first and second states to be distinguished is used to obtain the measurements.

The first operation is repeated a number of times and an average state of the qubit is calculated by taking the mean value of the individual measurements recorded following each performance of the first operation. The first measurement is therefore the expected value of the state of the qubit at the first error rate. This corresponds to a noisy measurement of an observable, i.e. a property of the system.

Once the first measurement has been obtained, the error rate of the quantum computer is modified S103. The error rate of the quantum computer is modified from the first error rate to a second error rate. The first error rate is typically the minimum achievable error rate, and modification of the error rate to the second error rate involves deliberately increasing the physical error rate. Importantly, in order to accurately model the effect of the noise on the measurement, any additional errors should arise from the same noise model. The experimentalist would understand that there are many ways in which this can be achieved in practice. Typically, an aim of the experimentalist is to reduce the noise level to its minimum possible severity. This can be achieved using a number of experimental techniques. In order to increase the noise level, the operation of the quantum computer may be modified to remove or reduce the effect of the noise-reducing elements employed by the experimentalist. For example, the timings between operations may be increased to increase the effective decoherence levels, the level of magnetic shielding may be reduced to increase random magnetic noise, or additional operations simulating the noise may be performed.

Having modified the error rate of the quantum computer in step S103, a second operation is performed on the state of the qubit in step S104 using the quantum processor. The second operation is performed on the same quantum device as the first operation but with the modified error rate, i.e. the second error rate, $n_2$. In this embodiment, the second error rate is greater than the first error rate. The state of the qubit is initialised before performing the second operation. The initialisation of the qubit leaves the qubit in a 'zero' state, which can be used as a baseline, or a reference point, from which the output state of the qubit can be measured.

In this embodiment the modification is in the form of a modifying operation performed in addition to the first operation. The second operation includes both the first operation and the modifying operation. In this embodiment, the assumed noise model is a Pauli noise model and therefore the modifying operation is a randomly selected Pauli gate.

The performance of an additional operation after the first operation increases the noise level. Examples of Pauli gates include the Pauli-X gate, $$X = \begin{bmatrix} 0 & 1 \\ 1 & 0 \end{bmatrix},$$

which performs a rotation about the x-axis; the Pauli-Y gate, $$Y = \begin{bmatrix} 0 & -i \\ i & 0 \end{bmatrix},$$

which performs a rotation about the y-axis; and the Pauli-Z gate, $$Z = \begin{bmatrix} 1 & 0 \\ 0 & -1 \end{bmatrix},$$

which performs a rotation about the z-axis; wherein the axes referred to are those of a Bloch sphere. A Bloch sphere can be used to represent a qubit state geometrically. It has been found that the change in expectation value of a Pauli observable with increased Pauli noise using random Pauli gates can be approximated using multi-exponential decay.

The second operation is performed a plurality of times. The second operation comprises the first operation and the modifying operation. Each performance of the first operation may be modified by performing the modifying operation such as a random Pauli gate. the second operation may be performed by performing the first operation and the modifying operation in an alternating manner such that each operation of the first operation is followed by an operation of the modifying operation. The operations may be performed in any order. Importantly, the different error rates associated with the first and second operations allow the state of the qubit to be measured as a function of error rate.

In step S105, a second measurement of the average state of the qubit is obtained using the quantum measurement device. The second measurement is obtained in a similar manner to the first measurement, but using the modified quantum computer. A measurement of the state of the qubit is obtained after each performance of the second operation, and the expected value of the state of the qubit is calculated by averaging the measurements recorded for each repeated second operation. The second measurement provides a second noisy measurement of the observable at a different error rate.

In order to estimate the error-free observable with a suitably high level of precision, the number of circuit runs, i.e. performance of first and second operations and their subsequent measurements, must be increased by a factor $C_E$ dependent on the first and second error rates. For example, for a first error rate $n_1$ and a second error rate $n_2 = \lambda n_1$, the cost factor $C_E$ is approximately equal to:

$$C_E \approx \frac{2}{(\lambda - 1)^2} (\lambda^2 e^{2\gamma n_1} + e^{2\lambda \gamma n_1})$$

wherein $\gamma$ is the observable decaying rate of the expected value of the observable with noise.

Having performed a suitable number of circuit runs in accordance with the cost factor $C_E$, the expected value of the observable can be plotted as a function of error rate. The first measurement of the expected value of the state of the qubit is at the first error rate and the second measurement of the expected value of the state of the qubit is at the second error rate. The expected value is reduced as the error rate increases. The effect of the increased error rate on the expected value of the observable can be used to estimate the error-free value.

It is expected that the expected value as a function of error rate will follow a trend. In order to estimate the error-free value, the measured values, i.e. the first, second, third and fourth measurements, can be fitted to a suitable trend and the error-free value can be estimated using extrapolation. Currently, an experimental quantum system cannot perform operations with less than a certain error rate. Therefore the mathematical estimation of an error-free value is important in near-future quantum computation, whilst fault-tolerant, or error-free, quantum computation is under development.

Once the second measurement has been obtained, the error rate of the quantum computer is modified S106. The error rate of the quantum computer is modified from the second error rate to a third error rate. The modification of the error rate from the second to third error rate is similar to the modification of the error rate from the first to second error rate described in step S103. In this example, the third error rate is greater than the second error rate. In an alternative example, the third error rate may be lower than the second error rate but greater than the first error rate.

In step S107, a third operation is performed on the state of the qubit. The third operation is performed a plurality of times and the state of the qubit is measured following each performance. The third operation has the third error rate. In this example, the third operation comprises the first operation and first and second modifying operations. The first and second modifying operations are randomly selected from the set of Pauli operations described in relation to step S104 above. The first and second modifying operations may be the same or may be different, and may differ for each performance of the third operation.

In step S108, a third measurement of the average state of the qubit is obtained using the quantum measurement device. The third measurement is obtained in a similar manner to the first and second measurements, but using the modified quantum computer. The expected value of the state of the qubit is calculated by averaging the measurements recorded for each repeated third operation. The third measurement provides a third noisy measurement of the observable at a different error rate.

Once the third measurement has been obtained, the error rate of the quantum computer is modified from the third error rate to a fourth error rate S109 as described above (S103, S106). In this example, the fourth error rate is greater than the third error rate.

In step S110, a fourth operation is performed on the state of the qubit. The fourth operation is performed a plurality of times and the state of the qubit is measured following each performance. The fourth operation has the fourth error rate. In this example, the fourth operation comprises the first operation and first, second and third modifying operations which are randomly selected from the set of Pauli operations described above (S104). In this example, the fourth error rate is greater than the third error rate. The first, second and third modifying operations may be performed in any order and do not relate to particular operations. The first, second and third modifying operations are randomly selected before each performance of the fourth operation.

In step S111, a fourth measurement of the average state of the qubit is obtained using the quantum measurement device. The fourth measurement is obtained in a similar manner to the first, second and third measurements, but using the modified quantum computer. The expected value of the state of the qubit is calculated by averaging the measurements recorded for each repeated fourth operation. The fourth measurement provides a fourth noisy measurement of the observable at another different error rate.

In step S112, the first, second, third and fourth measurements are fitted to a multi-exponential decay curve of the form $E=\Sigma_{k=1}^{K} A_k e^{-\gamma_k n}$. E is the average state of the qubit, n is the error rate, and $A_k$ and $\gamma_k$ are fitting parameters. The fitting parameter $\gamma_k$ is greater than or equal to 0, and less than or equal to 1, i.e. $0 \leq \gamma_k \leq 1$. This form of the decay curve is based on the assumption that the quantum circuit is subject to general Pauli noise, i.e. random Pauli errors. Pauli noise may occur due to environmental interactions or imperfect qubit control, for example. The fitting parameters are determined using a classical processor in a conventional computer.

The inclusion of multiple exponential components in the decay curve has been found to improve the estimation of the error-free observable. However, the use of additional exponentials in the summation comes at a cost $C_E$, as additional measurements are required to reduce the uncertainty in the calculation of the expected value. It has been found that the use of multiple exponential components provides a balance between improved estimation of the observable and overfitting, which can arise when the decay curve fits to the noise in addition to the underlying trend. Overfitting may occur in the event that there are not enough measurements to adequately determine the fitting parameters $A_k$ and $\gamma_k$. The minimum number of measurements required for a good fit is equal to the number of free parameters.

In this embodiment, K=2, and the multi-exponential decay curve is the summation of two exponentials, i.e. $E=A_1 e^{-\gamma_1 n}+A_2 e^{-\gamma_2 n}$. There are four free parameters: $A_1$, $A_2$, $\gamma_1$ and $\gamma_2$, and therefore the minimum number of measurements required for a good fit is four. Although the cost, i.e. the number of runs required when using a dual-exponential decay curve to fit the data, is slightly higher than for K=1, the absolute uncertainty in the estimation of the observable is greatly improved.

Finally, in step S113, the average state of the qubit is extrapolated at a fifth error rate using the fitted curve. The extrapolation is performed by the classical processor. The fifth error rate is lower than each of the first, second, third and fourth error rates. The first error rate in this embodiment is the lowest experimentally achievable error rate using the quantum device. The first, second, third and fourth error rates should be different in order to perform the fit, but it is not necessary for any of the first, second, third or fourth error rates to be the minimum achievable error rate. In this embodiment the fifth error rate is chosen as the zero error rate, wherein n=0. At the zero error rate, the estimated expected value is equal to the sum of the two determined amplitudes, i.e. $E_{n=0}=A_1+A_2$. This extrapolation technique returns an estimate of the error-free, or noiseless, observable.

In an alternative embodiment, the estimate of the error-free observable may be further improved by increasing the number of measurements taken, wherein each measurement is at a different error rate. The quantum device may be modified before performing additional operations, with each modification resulting in a new error rate. The state of the qubit is initialised before performing an i-th operation, wherein i>4. There is no theoretical upper limit on i, and the greater the value of i, the better the estimate of the error. However, each additional measurement comes at an additional experimental cost, and therefore for practical reasons the total number of measurements obtained is typically limited. Each i-th operation is performed using the same quantum device, with a different modification to the hardware in order to modify the error rate. Each i-th operation has an i-th error rate. In one example, each i-th operation includes the first operation and a modifying operation, wherein the modifying operation may include one or more operations such as Pauli gates.

Each i-th operation is performed in a similar manner to the second, third and fourth operations as described above in relation to steps S104, S107 and S110. Having performed the i-th operation, an i-th measurement of the average state of the qubit is obtained, similarly to the obtaining of the second, third and fourth measurements as described in relation to steps S105, S108 and S111. In the alternative embodiment described, each of the obtained measurements are fitted to the multi-exponential decay curve as described in relation to step S112.

Figure 2A:
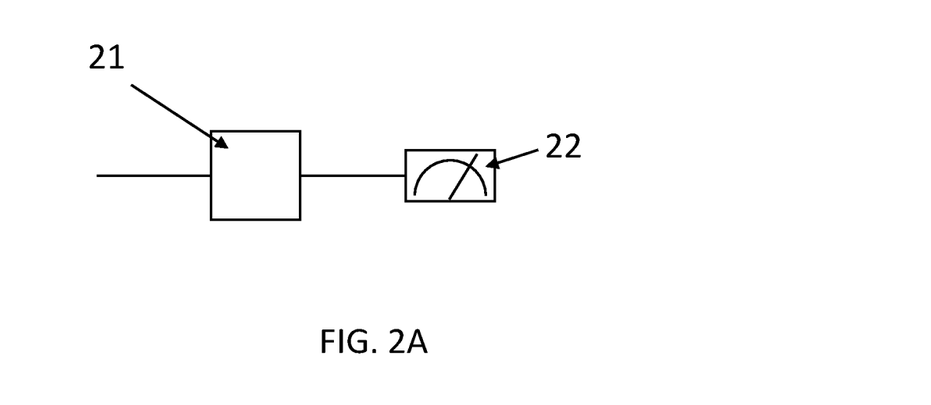
FIG. 2A is a schematic illustration of a first operation in accordance with a second embodiment.

FIG. 2A is a schematic illustration of a first operation 21 in accordance with a second embodiment. The first operation 21 is performed by a quantum processor on the state of a qubit. Subsequently, a quantum measurement device 22 obtains a measurement of the state of the qubit. The quantum processor is configured to perform the first operation 21 multiple times, and the state of the qubit is measured using the quantum measurement device 22 each time. The expected value of the measurement is determined by averaging these measurements.

Figure 2B:
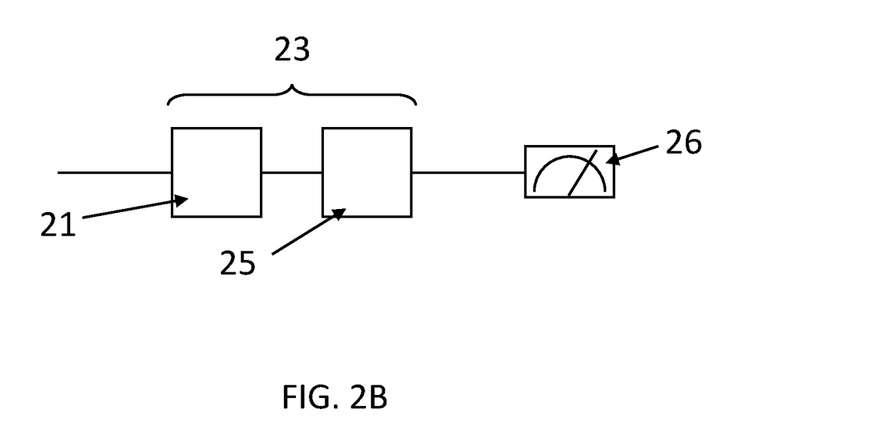
FIG. 2B is a schematic illustration of a second operation in accordance with the second embodiment.

FIG. 2B is a schematic illustration of a second operation in accordance with the second embodiment. In this embodiment, the second operation 23 comprises the first operation 21 and a modifying operation 25. After the quantum processor performs the second operation 23 on the state of the qubit, the quantum measurement device 26 obtains a measurement of the state of the qubit. The second operation 23 is performed multiple times, and the state of the qubit is measured using the quantum measurement device 26 each time. The modifying operation 25 is used to modify the quantum operation by adding a level of noise. The addition of the modifying operation 25 enhances the probability of an error occurring. The modifying operation 25 is selected from a set of operations which contribute to the noise model of the first operation 21. The expected value of the measurement taken with increased noise in this way is determined by averaging the measurements taken by the measurement device 26 following the performance of the second operation 23.

In an alternative embodiment in which an i-th operation is performed, the illustration of the second operation in FIG. 2B can be interpreted generally as depicting an i-th operation schematically. Each i-th operation may comprise more than one modifying operation in addition to the first operation.

Figure 3:
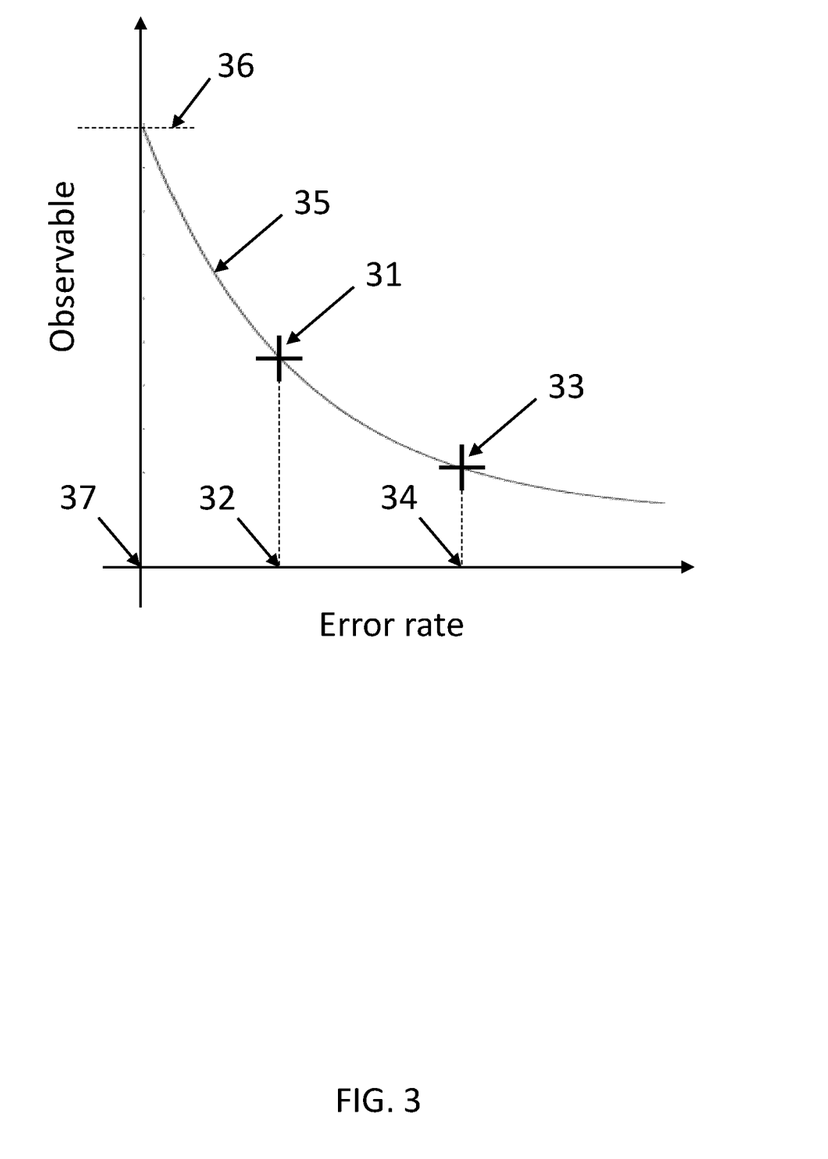
FIG. 3 is a graph illustrating the value of the observable as a function of error rate in accordance with a third embodiment.

FIG. 3 is an illustration of the fitting and extrapolation process in accordance with a third embodiment. The fitting and extrapolation is performed using a classical computer processor. A first measurement 31 at a first error rate 32 and a second measurement 33 at a second error rate 34 are obtained using the method described above. Third and fourth measurements are also obtained (not shown). In this embodiment, the first measurement 31 is greater than the second measurement 33 as the first error rate 32 is lower than the second error rate 34.

A multi-exponential decay curve 35 of the form $E=A_1 e^{-\gamma_1 n}+A_2 e^{-\gamma_2 n}$ is fitted to the first measurement 31, the second measurement 33, and the third and fourth measurements using the classical processor. Having determined the fitting parameters $A_1, A_2, \gamma_1$ and $\gamma_2$, the curve is extrapolated using the classical processor to the zero error rate 37, n=0. The error-free value of the observable 36 is estimated by extrapolating to zero error rate.

In an alternative embodiment, further measurements can be performed at additional error rates greater than the minimum circuit error rate to improve the estimation of the fitting parameters in the dual-exponential decay curve. At least four different error rates should be probed in order to provide a good estimate of the fitting parameters and consequently a good estimate of the error-free observable. Although more measurements are required when fitting the measurements to a dual-exponential decay curve rather than a single-exponential decay curve, the improved fit results in an estimation of an error-free observable with significantly lower estimation errors.

As will be appreciated, an improved error mitigation method is provided in which the estimation of the error-free observable is greatly improved. Sampling at different error rates by increasing the error rate of the quantum computer and fitting the resulting measurements to a multi-exponential decay curve allows the error-free value of the observable to be estimated using extrapolation.

The invention claimed is:

1. A method of mitigating errors when using a quantum computer comprising:
    performing a first operation on the state of a qubit a plurality of times; wherein the first operation has a first error rate;
    obtaining a first measurement of the average state of the qubit;
    modifying the error rate of the quantum computer from the first error rate to a second error rate;
    performing a second operation on the state of the qubit a plurality of times;
wherein the second operation has the second error rate;
    obtaining a second measurement of the average state of the qubit;
    modifying the error rate of the quantum computer from the second error rate to a third error rate;
    performing a third operation on the state of the qubit a plurality of times; wherein the third operation has the third error rate;
    obtaining a third measurement of the average state of the qubit;
    modifying the error rate of the quantum computer from the third error rate to a fourth error rate;
    performing a fourth operation on the state of the qubit a plurality of times;
wherein the fourth operation has the fourth error rate;
    obtaining a fourth measurement of the average state of the qubit;
    fitting the first, second, third and fourth measurements to a multi-exponential decay curve; and
    extrapolating the average state of the qubit at a fifth error rate using the fitted curve, wherein the fifth error rate is lower than the first, second, third and fourth error rates.

2. The method of mitigating errors according to claim 1, wherein the multi-exponential decay curve is the sum of two or more exponential curves with the following form: $E=\Sigma_{k=1}^{K} A_k e^{-\gamma_k n}$; wherein E is the average state of the qubit, n is an error rate, and $A_k$ and $\gamma_k$ are fitting parameters.

3. The method of mitigating errors according to claim 2, wherein K=2.

4. The method of mitigating errors according to claim 2, wherein $0 \leq \gamma_k \leq 1$.

5. The method of mitigating errors according to claim 1, wherein the second error rate is higher than the first error rate.

6. The method of mitigating errors according to claim 1, wherein the second operation comprises the first operation and a modifying operation.

7. The method of mitigating errors according to claim 6, wherein the modifying operation comprises a Pauli operation.

8. The method of mitigating errors according to claim 1, wherein performing the first operation a plurality of times comprises performing a plurality of first operations and wherein performing the second operation a plurality of times comprises performing a plurality of first operations and a plurality of modifying operations.

9. The method of mitigating errors according to claim 8, wherein performing the second operation a plurality of times comprises performing one of the plurality of modifying operations after each of the plurality of first operations.

10. The method of mitigating errors according to claim 1, further comprising:
    initialising the state of the qubit.

11. The method of mitigating errors according to claim 10, wherein the state of the qubit is initialised before each of the first, second, third and fourth operations is first performed.

12. The method of mitigating errors according to claim 1, further comprising:
    modifying the error rate of the quantum computer to an i-th error rate;
    performing an i-th operation on the state of the qubit; wherein the i-th operation has the i-th error rate; and wherein the i-th error rate is greater than the first error rate;
    obtaining an i-th measurement of the average state of the qubit; and
    fitting the first, second, third and fourth measurements and the i-th measurement to the multi-exponential decay curve.

13. A device for performing quantum computing calculations, comprising:
    a quantum processor configured to:
        perform a first operation a plurality of times on the state of a qubit, wherein the first operation has a first error rate;
        perform a second operation a plurality of times on the state of the qubit, wherein the second operation has a second error rate;
        perform a third operation a plurality of times on the state of the qubit, wherein the third operation has a third error rate; and
        perform a fourth operation a plurality of times on the state of the qubit, wherein the fourth operation has a fourth error rate;
    a quantum measurement gate configured to:
        obtain a first measurement of the average state of the qubit after the first operation;
        obtain a second measurement of the average state of the qubit after the second operation;
        obtain a third measurement of the average state of the qubit after the third operation; and
        obtain a fourth measurement of the average state of the qubit after the fourth operation; and a classical processor configured to fit the first, second, third and fourth measurements to a multi-exponential decay curve, and to extrapolate the average state of the qubit at a fifth error rate using the fitted curve, wherein the fifth error rate is lower than the first, second, third and fourth error rates.

14. A non-transitory computer readable memory medium comprising instructions which when executed by a computer cause the computer to carry out steps on a quantum computer comprising:

performing a first operation a plurality of times on the state of a qubit; wherein the first operation has a first error rate;

obtaining a first measurement of the average state of the qubit;

modifying the error rate of the quantum computer from the first error rate to a second error rate;

performing a second operation a plurality of times on the state of the qubit;

wherein the second operation has the second error rate;

obtaining a second measurement of the average state of the qubit;

modifying the error rate of the quantum computer from the second error rate to a third error rate;

performing a third operation a plurality of times on the state of the qubit; wherein the third operation has the third error rate;

obtaining a third measurement of the average state of the qubit;

modifying the error rate of the quantum computer from the third error rate to a fourth error rate;

performing a fourth operation a plurality of times on the state of the qubit;

wherein the fourth operation has the fourth error rate;

obtaining a fourth measurement of the average state of the qubit;

fitting the first, second, third and fourth measurements to a multi-exponential decay curve; and extrapolating the average state of the qubit at a fifth error rate using the fitted curve, wherein the fifth error rate is lower than the first, second, third and fourth error rates.

* * * * *